United States Patent [19]
Baum

[11] 3,876,418
[45] Apr. 8, 1975

[54] METHOD FOR COLLECTING THE FLUE GASES PRODUCED UPON THE CHARGING OF SCRAP AND TAPPING OF STEEL FROM ELECTRIC FURNACES

[75] Inventor: Jorg Peter Baum, Essen, Germany

[73] Assignee: Verfahrenstechnik Dr.-Ing. Kurt Baum, Essen, Germany

[22] Filed: July 10, 1972

[21] Appl. No.: 270,519

[30] Foreign Application Priority Data
July 17, 1971  Germany............................ 2135839

[52] U.S. Cl..................................... 75/10 R; 13/33
[51] Int. Cl............................ C22d 7/00; H05b 7/12
[58] Field of Search................ 75/10, 11, 49, 12, 46, 75/61; 266/15, 28, 31; 13/33

[56] References Cited
UNITED STATES PATENTS

| | | | |
|---|---|---|---|
| 3,173,980 | 3/1965 | Hysinger | 266/15 |
| 3,379,426 | 4/1968 | Reuter | 266/15 |
| 3,524,005 | 8/1970 | Scott | 13/33 |

Primary Examiner—L. DeWayne Rutledge
Assistant Examiner—Peter D. Rosenberg
Attorney, Agent, or Firm—Charles E. Baxley, Esq.

[57] ABSTRACT

This disclosure teaches a method and related system for collecting gases generated upon charging of scrap to and tapping of steel from an electric furnace. A charging basket is brought into sealed engagement with the furnace and is subjected to a vacuum. The top of a ladle is provided with an opening which is also subjected to a vacuum. Gases from the charging basket and from the ladle are delivered to a main aspirator duct to join gases generated during furnace operation for subsequent treatment.

4 Claims, 6 Drawing Figures

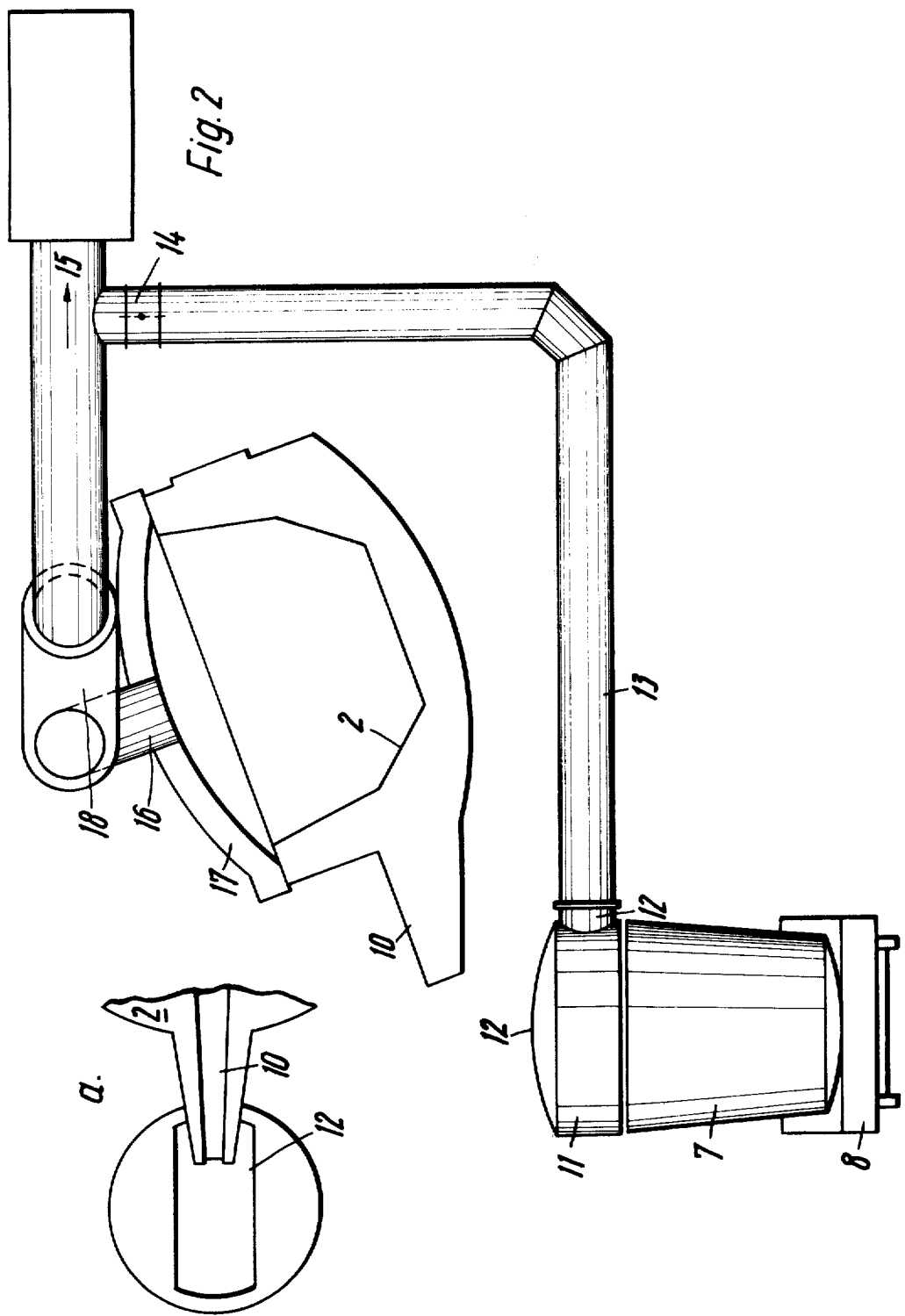

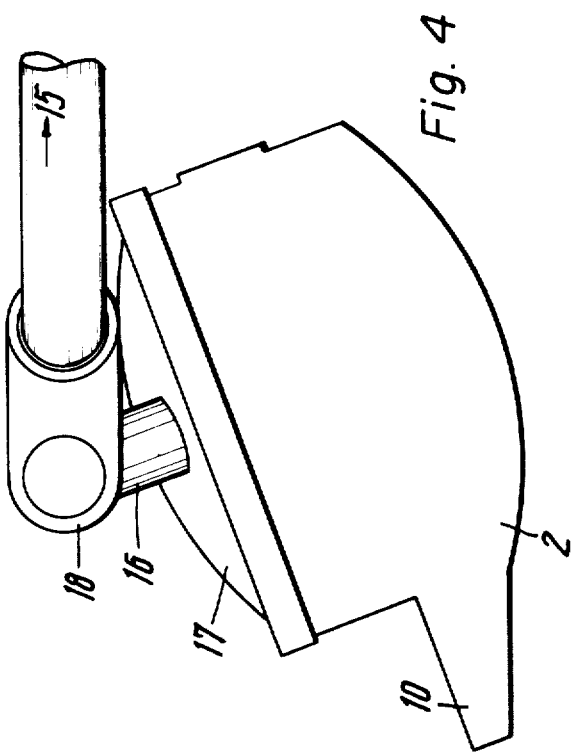
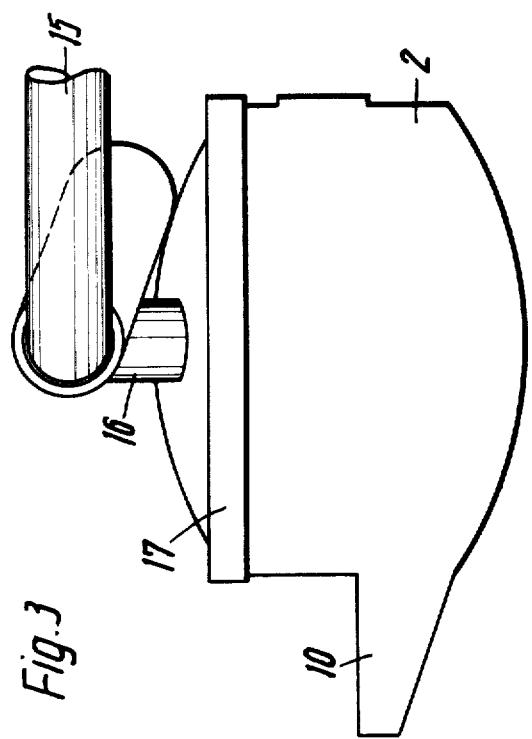
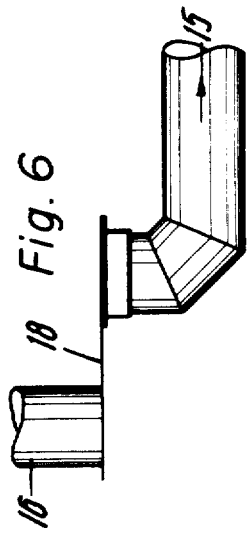
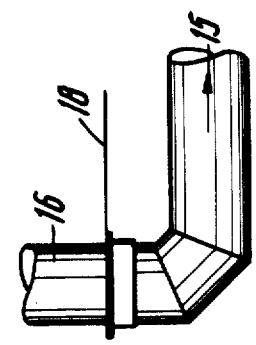

METHOD FOR COLLECTING THE FLUE GASES PRODUCED UPON THE CHARGING OF SCRAP AND TAPPING OF STEEL FROM ELECTRIC FURNACES

BACKGROUND OF INVENTION

Electric furnaces generally are charged with scrap. For this there is employed a scrap basket which allows its contents to drop into the hot furnace. In this connection flue gases are generated which have heretofore been collected by large hoods arranged far above the furnace. Upon melting of the scrap and upon conversion, preferably therefor upon oxygen blowing, considerable quantities of flue gases are generated.

Means are known for collecting flue gases generated in the electric furnace process such as (direct) aspiration of the furnace via a hole in the furnace cover, and in part via suction hoods at the electrodes and/or above the doors as well as by large hoods over the entire furnace. The latter, to be sure, makes it possible also to collect the flue gases generated upon the charging of the scrap and tapping of the molten steel. The disadvantage of this approach is, however, that these hoods must be arranged above the scrap-charging crane, i.e. high above the furnace. Accordingly an opportunity is given to the escaping flue gases to enter the various parts of the furnace room proper, which leads to a high degree of dilution upon their aspiration, so that gigantic quantities of flue gases plus air must be drawn off and purified before emission into the outer atmosphere. Investment and operating costs are accordingly very high. Further disadvantages are annoyance caused to operating personnel and, particularly also in the case of oil-containing scrap, damage due to action of smoke and flames on the charging crane, and so forth.

The flue gases which are produced during the general course of melting could heretofore be collected by such known methods of direct aspiration and could have dust removed therefrom. On the other hand, it is not possible with such methods and apparatus to collect and control the large additional quantities of flue gas which are produced in particular in large furnaces and with the use of oilcontaining scraps or faggots during the charging. Endless difficulties occur also in the collection of the flue gases generated upon tapping of the finished steel.

INVENTION

This is the point at which the present invention sets in. It is based on a discovery that the ordinary main dust removal can be combined in simple and selective manner with an additional dust removal in order to obtain a total removal of the dust from all flue gases which are obtained upon the melting of steel in the electric steel furnace.

The solution for the invention resides in the fact that the flue gases produced upon charging of the scrap are drawn off via a hood which consists of a closed scrap-charging basket and is placed closely over the furnace and via a laterally arranged connection which is so connected with the aspirator line of the main dust-removal via a sliding flange, in which connection the space consisting of the inside of the furnace and the scrap charging basket is placed under vacuum and the inside of the furnace is maintained so tight that the pressure produced upon the sudden development of the flue gases cannot escape to the outside.

In this connection it is advantageous also that the flue gases are collected and drawn off directly by means of a hood arranged on the steel-removal ladle, the steel is poured into the ladle via an upper slot in said hood, and said slot is so dimensioned that air is drawn through it with a speed of 5–10 m/sec., which is higher than the speed of ascent of the flue gas. It is necessary that upon connection with the main dust removal the direct aspiration is switched to steel-pouring dust removal, the suction connection of the direct aspiration being gradually closed upon tilting of the furnace by a slide plate on the cover of the furnace. Another improvement results from the fact that the amounts of flue gases obtained during the charging and emptying of the smelting furnaces are collected and purified in each case in front of the same flue-gas purifying plant as also treats the flue gases of the smelting operation.

DESCRIPTION OF DRAWINGS

An apparatus for the use of the new method is shown diagrammatically in the drawings; FIG. 2 shows the carrying out of the method upon the drawing off of the flue gases which are produced upon tapping of the liquid steel. FIGS. 3, 4, 5 and 6 show details. The following construction and manner of operation of the new process can be noted from the drawings.

DESCRIPTION OF PREFERRED EMBODIMENT

Figure 1:
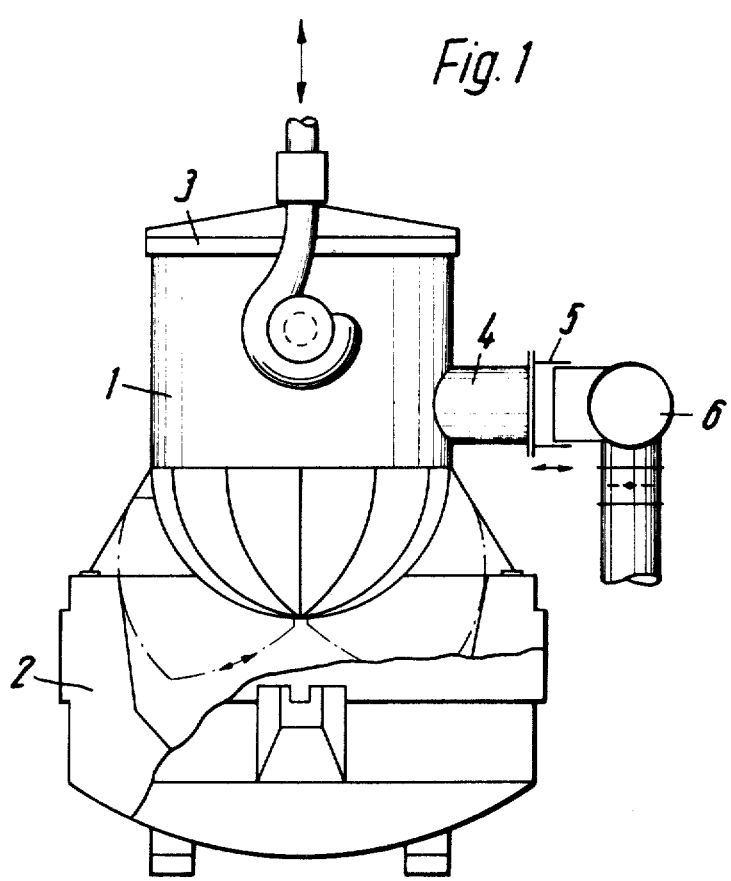
FIG. 1 shows the scrap charging basket developed as a suction hood, placed directly on the electric furnace.

In order to prevent the flue gases generated upon the charging of the scrap escaping into the workroom and acting on the scrapcharging crane, the scrap-charging basket is developed as an aspiration hood which is placed directly on the opened electric furnace 2. For this purpose the scrap-charging basket 1 is closed on top by a lid 3 and is provided with an aspiration connection which is connected via a sliding flange 5 with the aspiration line 6. This aspiration line 6 is connected with the main dust-removal plant (not shown) via conduit 15 for the aspiration of the furnace which is not needed at this time, whereby the entire plant can be made particularly economical.

In FIG. 2 the arrow 15 indicates the conduit to the main dust-removal plant. By this connection of aspiration line 15 to the dust-removal plant, the space formed from the inside of the furnace 2 and the scrap basket 1 is placed under vacuum. Due to the fact that the scrap basket 1 is placed on the upper edge of the furnace 2, the space therebetween is closed tightly so that the flue gases cannot escape into the room even in the case of pressure. After the opening of the charging basket 1, the scrap falls into the furnace 2 and the flue gases which are generated thereby in a thick cloud fill the space which is under vacuum.

The flue gases which are produced upon the tapping of the liquid steel are again obtained at a time in which the dust-removal plant is not required for the aspiration of the furnace; they are collected in accordance with the new method in accordance with FIGS. 2–4 and drawn up as follows. The steel-removal ladle 7 is brought, for instance, by a steel-removal truck 8 below the outlet 10 of the electric furnace 2. Above the steel-removal ladle 7 there is located the suction hood 11 the upper part of which is provided with a pouring slit 12 through which the steel is poured into the steel-removal ladle 7. This suction hood 11 is connected via a lateral connection 12 with the suction line 13 which in its turn is connected via a shutoff member 14 with the main aspiration line 15.

The pouring slit 12 of the suction hood 11 is so dimensioned that upon operation there is produced in it an air velocity of 5–10 m/sec., which is greater than the speed of ascent of the flue gases produced after impingement of the liquid steel in the ladle 7.

If all three suctions, the scrap-charging suction 4–6, the furnace direct suction and the steel tapping suction 12, 13 are in accordance with the method of the invention connected to a common dust-removal plant via main aspiration line 15, the suction connection 16 of the furnace direct suction is closed by a closure plate 18 arranged on the furnace cover 17 upon the tilting of the furnace, as shown in FIGS. 4 and 5 and in FIG. 6 for the two end positions turned 90°. In this way assurance is had that after the closure member 14 of the steel-removal suction has been opened, the suction passes progressively upon the tilting from direct suction to steelremoval suction.

The particular advantage of the new method resides in the fact that the dust obtained at the time is collected directly at the place where it is produced without great dilution by air and is thus prevented from penetrating into the surrounding atmosphere and is removed in the same dust-removal plant, namely the furnace direct suction which is in any event present.

It will be understood by those familiar with operation of electric steel furnaces that various deviations may be made from the foregoing preferred embodiment without departing from the main theme of invention set forth in the following claims.

I claim:

1. A method for recovering gases from an electric furnace, having an opening in a top portion thereof, which gases are produced during charging of material to the furnace from a charge basket through the opening and in tapping material from the furnace by tilting the furnace and pouring material through a spout into a ladle having an opening in its top, and wherein gases produced during regular operation of the furnace are recovered by aspiration through an aspirator duct, the method comprising steps as follows:
   bringing the charge basket into tight communication with the opening in the furnace;
   subjecting a space comprising the inside of the charge basket and the inside of the furnace to a vacuum;
   shutting off flow of gases from the furnace through the aspirator duct;
   opening a connection between the charge basket and the aspirator duct; and
   withdrawing gases during the charging through the basket via the aspirator duct.

2. A method according to claim 1 further comprising:
   maintaining a flow of air over the opening in the top of the ladle at a rate of 5 to 10 meters per second; and
   withdrawing gases from the ladle at a point below the top of the ladle via the aspirator duct.

3. A method according to claim 2 wherein during removal of gases during the tapping of material from the furnace connection between the furnace and the aspirator duct is closed gradually as the furnace is tilted.

4. A method according to claim 2 wherein gases removed during the charging, tapping and regular operation of the furnace are combined and purified by subsequent treatment.

* * * * *